Dec. 17, 1946.  W. D. HERSHBERGER  2,412,682
SWEEP OR PULSE GENERATOR
Filed July 31, 1942  2 Sheets-Sheet 2
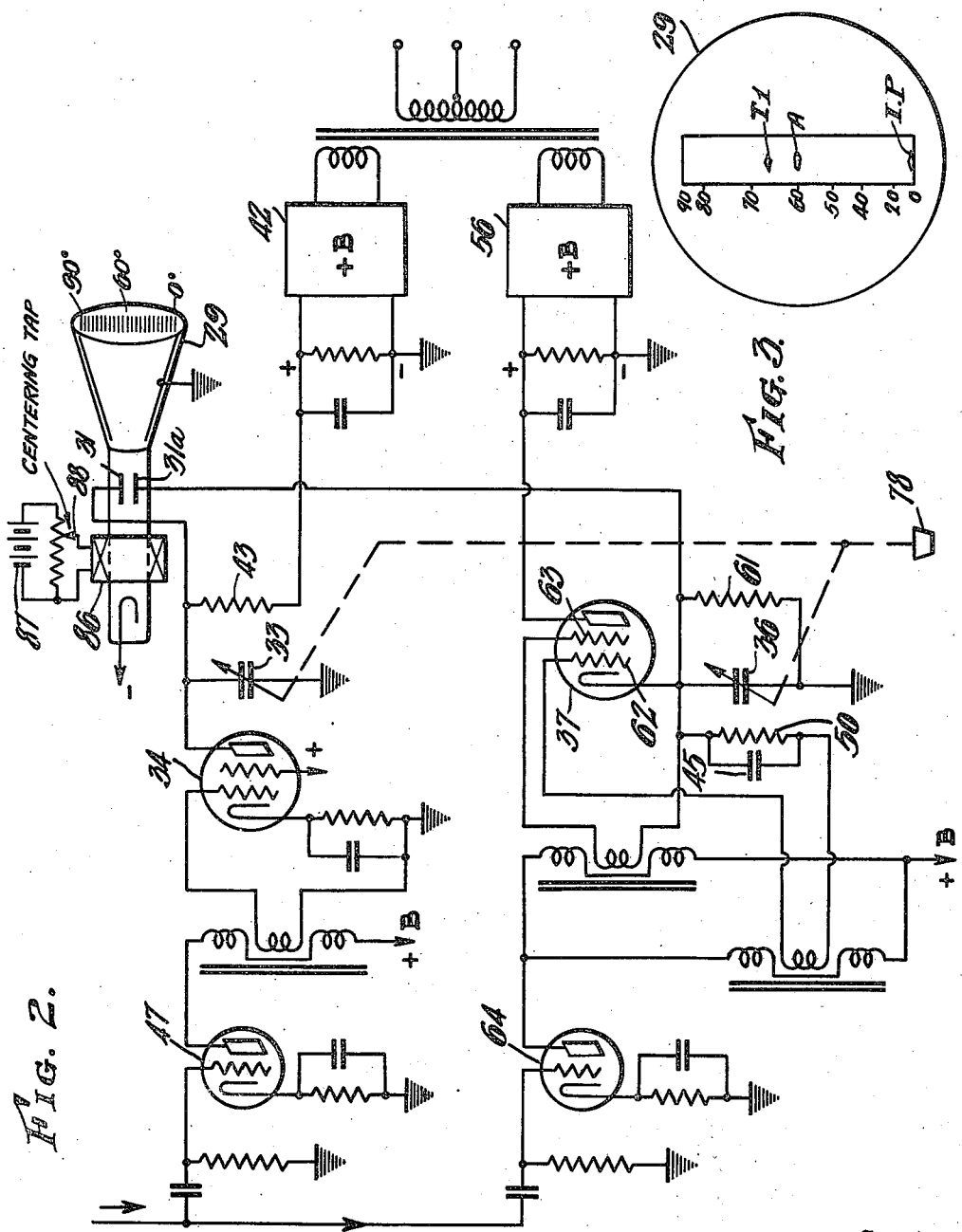
Inventor
WILLIAM D. HERSHBERGER
By C. D. Tuska
Attorney Patented Dec. 17, 1946

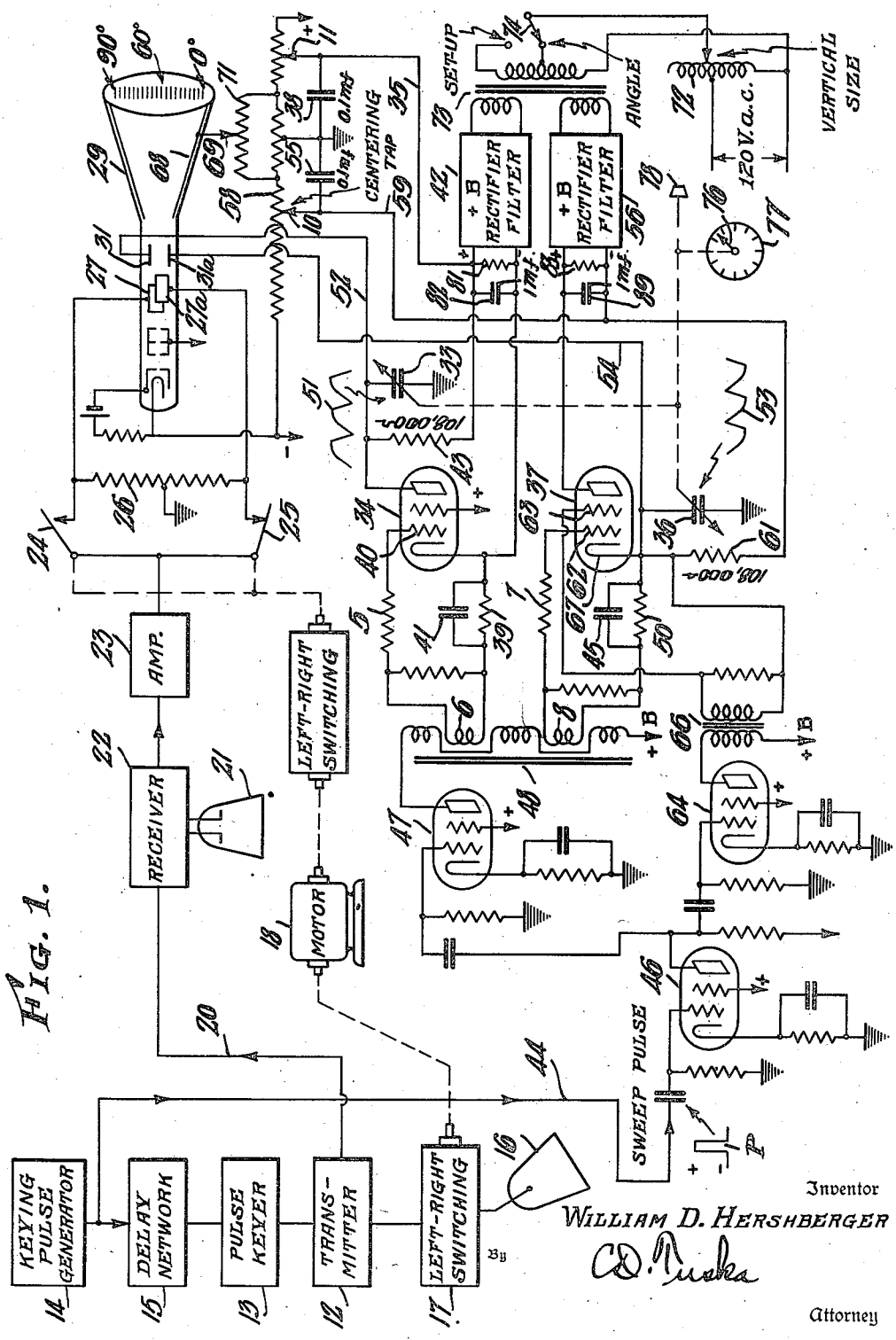

2,412,682

UNITED STATES PATENT OFFICE 2,412,682

SWEEP OR PULSE GENERATOR

William D. Hershberger, Haddonfield, N. J., assignor to Radio Corporation of America, a corporation of Delaware Application July 31, 1942, Serial No. 453,088

5 Claims. (Cl. 315—29)

My invention relates to cathode ray deflecting circuits and particularly to deflecting circuits for producing an exponential deflection to be used, for example, in a radio pulse-echo system for measuring the angle formed by a line from an aircraft to a ship or other target and a perpendicular line from the aircraft to earth.

The present invention is an improvement on the deflecting circuit of the pulse-echo system for measuring angles described in application Serial No. 452,989, filed July 31, 1942, in the name of Irving Wolff.

An object of the invention is to provide an improved deflecting circuit for producing an exponential deflection of a cathode ray.

A further object of the invention is to provide an improved cathode ray deflecting circuit for producing an exponential deflection without defocusing the cathode ray during deflection.

The invention will be described for the purpose of illustration as applied to a radio pulse-echo system which radiates a signal downward and forward from an aircraft whereby reflections that are a measure of altitude will be received from the earth directly below the plane while other reflections will be received from the target ahead. Since the first occurring reflection will be a measure of the distance A perpendicular to the earth, the angle $\theta$ between this perpendicular line and the line from the aircraft to the target can be determined when the distance $T_1$ to the target is also known. The latter distance $T_1$ is shown by a later occurring reflection from the target. From the fact that the distance to the target divided by the altitude is the secant of the angle $\theta$, the angle $\theta$ may be calculated. As described in the above-mentioned Wolff application, however, the apparatus is so designed that the angle $\theta$ may be read directly on scale without the necessity of any calculations.

The present invention provides a precise exponential sweep or timing voltage that can be applied directly to a pair of deflecting plates of a cathode ray tube without defocusing the cathode ray. In a preferred embodiment of the invention two capacitors are connected in the plate and cathode circuits, respectively, of two vacuum tubes which are made periodically current conducting to cause sawtooth voltages of opposite polarities to appear across the two capacitors. These sawtooth voltages are applied directly to the two plates, respectively, of the pair of deflecting plates in the cathode ray tube. The vacuum tube that has a capacitor in its cathode circuit preferably has a screen grid electrode which is driven positive by a voltage pulse during the period this tube is made conductive.

The invention will be better understood from the following description taken in connection with the accompanying drawings in which Fig. 1 is a block and circuit diagram of apparatus embodying my invention, Fig. 2 is a circuit diagram of another embodiment of my invention, and Fig. 3 is a view of the end of the cathode ray tube in Fig. 1. In the several figures like parts are indicated by similar reference characters.

Referring to Fig. 1 of the drawings, a high frequency radio transmitter 12 is keyed by means of a pulse keyer 13 and a keying pulse generator 14 to radiate short radio pulses downward and forward from a suitable directive antenna system 16. The transmitter pulses are also supplied over a conductor 20 to a receiver 22 to function as initial or time reference pulses. The keying pulses preferably are applied to the keyer 13 through a delay circuit 15. The antenna system 16 may be two dipoles in parabolic reflectors which radiate in overlapping left-hand and right-hand radiation patterns, only one dipole and reflector being shown in the drawings. The two dipoles are connected alternately to the transmitter 12 by means of suitable left-right switching means 17 driven by a motor 18. The transmitted pulses may occur at the rate of 3500 per second and have a duration of 0.3 micro-second; the switching from left to right may occur at the rate of 60 per second. These values are given merely by way of example.

The reflected pulses are picked up by a suitable antenna such as a dipole 21 and supplied to the receiver 22 which amplifies and demodulates them. They are further amplified by an amplifier 23 and applied through switch arms 24 and 25 to a pair of deflecting plates 27 and 27a of a cathode ray tube 29. A resistor 26 with a grounded midpoint is connected across the deflecting plates 27 and 27a. The switch arms 24 and 25 are operated synchronously with the left-right antenna switching whereby the cathode ray of tube 29 is deflected to give a left indication when the antenna radiation is toward the left and to give a right indication when the antenna radiation is toward the right. The alternate closing of switches 24 and 25 is effected by means of a suitable left-right switching mechanism driven by the motor 18. The cathode ray tube 29 may be of conventional design and is provided with a second pair of deflecting plates 31 and 31a positioned at right angles to the other pair of plates. An exponential sweep or timing voltage is applied to the plates 31 and 31a to deflect the cathode ray vertically at a repetition rate of 3500 sweeps per second in the example being described.

My improved push-pull deflecting circuit is especially adapted for supplying a suitable exponential voltage for use in apparatus of the above-described type. It comprises a variable capacitor 33 associated with a plate loaded tube 34 and a variable capacitor 36 associated with a cathode loaded tube 37. The tube 34 functions as a discharge tube for capacitor 33 and may be a screen grid tube which is biased substantially to plate current cutoff by means of grid leak biasing provided by a resistor 39 and a capacitor 41 in the control grid circuit, for example. The grid circuit of tube 34 preferably includes a low resistance resistor 5 for reducing parasitic oscillations. Capacitor 33 receives a charge from a voltage source 42 through the tube 34 upon the application of a pulse P to the control grid 40 of tube 34 from the pulse generator 14. The output circuit of source 42 includes the usual bleeder resistor 81 and filter capacitor 82. The pulses P are applied from a generator 14 through a conductor 44, an amplifier tube 46, an amplifier tube 47 and a transformer 48 which has a secondary winding 6 that is damped by a shunting resistor.

The charging path for capacitor 33 may be traced from the positive terminal of voltage source 42 through a conductor 35 and a section of the voltage divider 58 and its bypass capacitor 38 to ground, through ground to the lower terminal of capacitor 33, and through the capacitor 33 and the plate-cathode impedance of tubes 34 to the negative terminal of the voltage source 42. At the end of the pulse P the capacitor 33 discharges through a path that may be traced from the upper terminal of capacitor 33 through the resistor 43 of tube 34, the conductor 35, a section of voltage divider 58 and its bypass capacitor 38 to ground, and through ground to the lower terminal of capacitor 33.

It should be noted that the capacitor 33 always discharges completely to bring its upper terminal (and also the deflecting plate 31) to the centering potential at the tap 11. It is at the end of the discharge period that the cathode ray is at the upper end of its sweep. It follows that changing the amplitude of voltage from source 42 does not affect the centering at this end of the sweep so far as capacitor 33 is concerned. The same is true with respect to capacitor 36 as will immediately be apparent. The lower terminal of capacitor 33 may be connected to the negative terminal of voltage source 42 instead of to ground, if desired.

The sweep voltage appearing across capacitor 33 is shown at 51. It has a wave shape that may be described as a non-linear sawtooth wave shape, the useful deflecting portion of the sawtooth being exponential, that is, being "bent over" in accordance with the discharging of capacitor 33 through resistor 43 at an exponential rate. Preferably during each pulse P the capacitor 33 is fully charged and at the end of each discharging period it is completely discharged. The voltage wave 51 is applied over a conductor 52 directly to the deflecting plate 31.

The sweep voltage appearing across capacitor 36 is shown at 53. It has the same wave shape as the voltage wave 51 but is of opposite polarity and is applied over a conductor 54 directly to the deflecting plate 31a. The desired polarity of the wave 53 is obtained by connecting the capacitor 36 in the cathode circuit of tube 37 rather than in the plate circuit. Capacitor 36 receives its charge from a voltage supply 56 through the anode-cathode impedance of tube 37 when said impedance is lowered by the occurrence of a voltage pulse P as will be explained below. The output circuit of source 56 includes the usual bleeder resistor 83 and filter capacitor 89. The tube 37, like the tube 34, is normally biased to substantially cut-off by means of grid circuit elements 45 and 59, and preferably is provided with a parasitic reducing resistor 7. The path of the charging current may be traced from the positive terminal of source 56 through the tube 37, the capacitor 36 to ground, from ground through a voltage divider resistor 58 and a bypass capacitor 55 to a centering tap 10 located thereon, and through a conductor 59 to the other terminal of the source 56. At the end of a pulse P the capacitor 36 discharges through a cathode resistor 61, the conductor 59 and the portion of the voltage divider 58 located between the centering tap 10 and ground. Here again the capacitor discharges completely bringing the upper terminal of capacitor 36 to the centering potential at tap 10 whereby the upper end position of the cathode ray sweep is independent of changes in the voltage amplitude of source 56.

The centering circuit disclosed in this application is described and claimed in copending application Serial No. 455,409, filed August 20, 1942, in the name of Max H. Mesner, and entitled Exponential deflecting and centering circuits.

In the particular equipment being described, the time constant of the sweep circuit 33—43 (or circuit 36—61), when set to measure the maximum altitude, such as 20,000 feet, is about one-fifth the period of the vertical sweep, this being the condition for maximum resistance and maximum capacitance in the sweep circuit and for the least amount of discharge of the capacitor 33 (and of capacitor 36) at the end of the sweep. Even for this condition capacitors 33 and 36 are substantially completely discharged; specifically, if the charging voltage from source 42 is 2000 volts, the capacitor 33 discharges to 7 or 8 volts which is such a small percentage of the charging voltage that the failure to discharge to zero volts does not affect the operation.

Referring again to the charging period for capacitor 36, the plate-cathode impedance of tube 37 is lowered during the occurrence of each pulse P by applying these pulses simultaneously to its control grid 62 and to its screen grid 63. The control grid 62 receives its pulse through the secondary 8 of transformer 48 while the screen grid 63 receives its pulse through an amplifier tube 64 and a transformer 66, the tube 64 being coupled to the anode circuit of amplifier tube 46. The secondary 8 and the secondary of transformer 66 are shunted by damping resistors. It will be noted that the voltage pulses are applied to the grids 62 and 63 with respect to the cathode 67 of tube 37, not with respect to ground. As a result, it is possible to operate tube 37 with good gain whereby no difficulty is encountered in driving the tube 37 from its normal anode current cut-off condition to low anode-cathode impedance by a pulse P of reasonable amplitude. The reason for applying the voltage pulses to the screen grid 63 as well as to the control grid 62 is that the cathode 67 swings positive above ground potential when capacitor 36 receives its charge. By applying a pulse to the screen grid 63 at this time, it is brought to the proper positive potential with respect to the cathode 67. Care is taken to make the secondary windings of transformers 48 and 66 have low capacity with respect to the primary windings whereby the secondary windings can readily swing above ground potential.

My improved sweep circuit does not defocus the cathode ray during the sweep deflection because the deflecting voltage waves 51 and 53 swing the deflecting plates 31 and 31a, respectively, about ground potential, this also being substantially the potential of the second anode 68 of cathode ray tube 29. The second anode potential may be adjusted by means of a movable tap 69 on a potentiometer resistor 71 which has its ends connected to opposite sides of a grounded point on the voltage divider 58.

The voltage sources 42 and 56 are rectifier-filter units supplied with power from an A.-C. line through a voltage control unit 72 such as a "Variac" and through a transformer 73. Adjustment of the tap marked "Vertical size" adjusts the amplitude of the vertical sweep. The primary winding of transformer 73 has a midtap and an end tap, indicated by the legends "Angle" and "Set-up," respectively. By moving a switch arm 74 from its "set-up" position to its "angle" position the voltage supplied by the units 42 and 56 is doubled and the amplitude of the vertical sweep is doubled.

The variable capacitors 33 and 36 are mechanically coupled to a dial pointer 76 associated with an altitude scale 77. Thus the pointer 76 rotates when a knob 78 is rotated to change the capacity of capacitors 33 and 36 for the purpose of "set up" and for obtaining altitude as explained below. In the example being described, each of the capacitors 33 and 36 has a capacity range from 150 mmf. to 550 mmf.

The procedure in setting up and reading the altitude and angle scales, is as follows:

(1) The switch 74 is thrown to the "set up" position shown in the drawings so that one-half full deflection voltage is applied from capacitors 33 and 36 to the vertical deflecting plates 31 and 31a.

(2) The end of the vertical sweep or cathode ray trace is brought opposite the 90 degree mark at the top of the angle scale by adjusting the centering tap 10 on voltage divider 58.

(3) The initial or time reference pulse I. P. (Fig. 3) is then brought opposite the zero mark at the bottom of the angle scale by means of the "vertical size" tap. With my deflecting circuit it is not necessary to re-center to keep the end of the trace opposite the 90 degree mark since the capacitors 33 and 36 always discharge to the centering potentials whereby the upper end of the trace remains fixed.

(4) The altitude echo pulse A (Fig 3) is next brought opposite the 60 degree mark, which is at the mid-point on the angle scale, by rotating the knob 78 and thereby adjusting the rate of discharge of capacitors 33 and 38. This is the adjustment that brings the voltage across capacitors 33 and 38 to one-half the initial voltage value and the indication then occurs at the 60 degree mark. Rotation of the knob 78 also rotates the pointer 76 of the altitude scale from which the altitude may now be read.

(5) The switch 74 is next moved to its "angle measuring" position putting the full sweep voltage on the vertical deflecting plates whereby the length of the vertical sweep is doubled. This brings the altitude pulse A to the zero mark on the angle scale. As noted above, the upper end of the sweep trace does not change its position and no further centering is required. The initial pulse moves off the scale.

(6) The angle $\theta$ for a target that reflects a pulse $T_1$ (Fig. 3) may now be read directly from the point on the angle scale opposite the pulse $T_1$. The reason that the angle $\theta$ and the altitude can be determined in the manner described above has been more fully described in the above-identified Wolff application but need not be repeated here.

From the foregoing it will be seen that altitude may be read from the dial 77 and the angle $\theta$ from the scale on the cathode ray tube 29. At the same time the indications reveal whether the target sought is to the right or left of line of flight of the aircraft. This is accomplished by the alternate antenna switching previously described which is done at a superflicker rate. A visual comparison between the amplitudes of the pulses corresponding to the echoes from the left and right is made to determine the direction in which the target lies.

It will also be apparent that a precise exponential sweep deflection is provided without defocusing the cathode ray of the indicator tube. The precision of the sweep is insured by the fact that the voltages appearing across capacitors 33 and 36 are applied directly to the deflecting plates.

In the drawings the values of various circuit elements have been indicated, merely by way of example, in ohms and microfarads.

In Fig. 2 the vertical sweep circuit is similar to that of Fig. 1 but the negative terminals of the voltage sources 42 and 56 are grounded and the centering is accomplished by means of a deflecting coil 86 supplied with direct current from a battery or other suitable source 87. The upper end of the vertical sweep at the end of tube 29 is brought opposite the 90 degree mark by adjusting a centering tap 88.

A minor difference between Figs. 1 and 2 is that in Fig. 2 the tube 34 is biased substantially to cutoff by cathode biasing instead of by grid leak biasing. A more important difference is that in Fig. 2 the screen grid 63 and the control grid 62 of tube 37 have the pulses P applied thereto from the same amplifier tube 64 instead of from different amplifier tubes.

It will be understood that the circuit of Fig. 2 operates the same as the circuit of Fig. 1 except as to the differences mentioned above.

I claim as my invention:

1. A cathode ray deflecting circuit comprising an electric discharge tube having a control grid circuit and an anode circuit, a capacitor and an anode resistor located in said anode circuit, means for charging said capacitor through said tube in response to the application of periodically recurring pulses to said control grid circuit, means for discharging said capacitor through said resistor, a second electric discharge tube having a control grid, an anode and a cathode, a capacitor connected between said cathode and a point that is negative with respect to said cathode, means for charging said last capacitor through said second tube in response to the application of said pulses to the said grid of said second tube, a cathode resistor for said second tube, and means for discharging said last capacitor through said cathode resistor whereby sawtooth deflecting voltages of opposite polarity appear across said capacitors.

2. A cathode ray deflecting circuit comprising an electric discharge tube having a control grid circuit and an anode circuit, a capacitor located in said anode circuit, means for alternately substantially completely charging said capacitor and substantially completely discharging said capacitor in response to the application of periodically recurring pulses to said control grid circuit, a second electric discharge tube having a control grid, a screen grid, an anode and a cathode, means for so applying said pulses to said last named grids as to drive them positive with respect to the cathode of said second tube, and a capacitor connected between said cathode and a point that is negative with respect to said cathode, and means for alternately substantially completely charging said last capacitor and substantially completely discharging said last capacitor in response to the application of said pulses to the said grids of said second tube.

3. A cathode ray deflecting circuit comprising an electric discharge tube having a control grid circuit and an anode circuit, a capacitor located in said anode circuit, means for alternately substantially completely charging said capacitor and substantially completely discharging said capacitor in response to the application of periodically recurring pulses to said control grid circuit, a second electric discharge tube having a control grid, a screen grid, an anode and a cathode, means for so applying said pulses to said last named grids as to drive them positive with respect to the cathode of said second tube, and a capacitor connected between said cathode and a point that is negative with respect to said cathode, means for alternately substantially completely charging said last capacitor and substantially completely discharging said last capacitor in response to the application of said pulses to the said grids of said second tube, a cathode ray tube having a pair of deflecting plates, and means for applying the voltages appearing across said capacitors to said deflecting plates in push-pull relation.

4. A cathode ray deflecting circuit comprising an electric discharge tube having a control grid circuit and an anode circuit, a capacitor and an anode resistor located in said anode circuit, means for charging said capacitor through said tube in response to the application of periodically recurring pulses to said control grid circuit, means for discharging said capacitor through said resistor, a second electric discharge tube having a control grid, a screen grid, an anode and a cathode, means for so applying said pulses to said last named grids as to drive them positive with respect to the cathode of said second tube, a capacitor connected between said cathode and a point that is negative with respect to said cathode, means for charging said last capacitor through said second tube in response to the application of said pulses to the said grids of said second tube, a cathode resistor for said second tube, and means for discharging said last capacitor through said cathode resistor.

5. A cathode ray deflecting circuit comprising an electric discharge tube having a control grid circuit and an anode circuit, a capacitor and an anode resistor located in said anode circuit, means for charging said capacitor through said tube in response to the application of periodically recurring pulses to said control grid circuits, means for discharging said capacitor through said resistor, a second electric discharge tube having a control grid, a screen grid, an anode and a cathode, means for so applying said pulses to said last named grids as to drive them positive with respect to the cathode of said second tube, a capacitor connected between said cathode and a point that is negative with respect to said cathode, means for charging said last capacitor through said second tube in response to the application of said pulses to the said grids of said second tube, a cathode resistor for said second tube, means for discharging said last capacitor through said cathode resistor whereby sawtooth deflecting voltages of opposite polarity appear across said capacitors, a cathode ray tube having a pair of deflecting plates, and means for applying said deflecting voltages directly to said deflecting plates.

WILLIAM D. HERSHBERGER.